United States Patent

[11] 3,616,230

[72] Inventors Joseph Roberts;
Joseph M. Hill, both of Dallas, Tex.
[21] Appl. No. 735,196
[22] Filed June 7, 1968
[45] Patented Oct. 26, 1971
[73] Assignee J.K. Wadley and Susie L. Research
Institute and Blood Bank
Dallas, Tex.

[54] METHOD FOR PRODUCTION OF L-ASPARAGINASE
11 Claims, No Drawings
[52] U.S. Cl. .................................................. 195/66 A
[51] Int. Cl. ....................................................... C12d 13/10
[50] Field of Search ........................................ 195/66 A

[56] References Cited
UNITED STATES PATENTS
3,390,054 6/1968 Morihara ..................... 195/66
3,440,142 4/1969 Teller .......................... 195/66

OTHER REFERENCES
Cedar et al., Journal Of Biological Chemistry Vol. 242 pg. 3753 to 3755, Aug. 25, 1967
Davis et al., Journal of Bacteriology Vol. 60 pg. 17- 28 (1950).

Primary Examiner—Lionel M. Shapiro
Attorney—Richards, Harris & Hubbard

ABSTRACT: A method of producing L-Asparaginase from a microbial organism, such as Escherichia coli, which encompasses the use of a nutrient medium for growth of the microbial organism which contains a substantial amount of free L-threonine or lactic acid and free amino acids, and in particular free L-glutamic acid and L-methionine. A preferred nutrient medium which contains the above constituents in a substantial amount is a diluted corn steep liquor which has preferably been adjusted to a pH of about 7, centrifuged or filtered and autoclaved before inoculation with the microbial organism.

3,616,230

METHOD FOR PRODUCTION OF L-ASPARAGINASE

FIELD OF THE INVENTION

This invention relates to chemistry and more particularly to a process of producing L-Asparaginase from microbial organisms.

PRIOR ART

In 1953 it was observed that guinea pig serum caused regression of some types of tumors in mice and rats. Eight years later the antitumor agent in the guinea pig serum was identified as L-Asparaginase. L-Asparaginase as used herein is intended to identify the enzyme L-Asparagine amidohydrolase having the Enzyme Commission Number 3.5.1.1.

Analysis revealed that the normal guinea pig yielded only about 30 International Units of L-Asparaginase which rendered the cost of the drug prohibitive for administration to humans. One International Unit (I.U.) of L-Asparaginase is that amount which will liberate one micromole of $NH_3$ from L-Asparagine per minute at 37° C. and pH 8.0. Human dosage may, for example, require 1,000,000 I.U. or more per day per person. Production of such dosages would necessitate that serum be extracted from over 30,000 guinea pigs per day per person being treated with the serum. With the cost of guinea pigs being about $2 per guinea pig, the cost of one days dosage for one individual could amount to nearly $60,000 for the guinea pigs, in addition to which must be added the cost of processing the large quantity of serum.

In 1964, it was learned that L-Asparaginase isolated from Escherichia coli (*E. coli*) also exhibited antitumor properties. Several methods were suggested for producing L-Asparaginase from *E. coli*. The *E. coli* was normally cultivated in a nutrient medium such as trypticase soy agar, peptone or Kornberg solutions (H. A. Campbell et al. (1967) Biochemistry 6,7121). The *E. coli* after being cultivated for a period of 15 to 20 hours was harvested and the enzymes contained within the bacterial cells, following rupture of the cells by sonication, were purified by various procedures such as those suggested by Mashburn and Wriston (1966) Nature 211, 1403 and Mashburn and Wriston (1964) Arch. Biochem. Biophys. 105, 451.

The nutrient media heretofore employed have produced relatively low yields of L-Asparaginase. As an example, a 400 gallon fermenter containing a conventional nutrient medium can be expected to yield about 44 pounds of "wet weight" *E. coli*. From this amount of *E. coli* only about one-thirtieth of an ounce of L-Asparaginase (about 200,000 I.U.) can be extracted by techniques commonly employed, and the cost of the material is about $40,000 per million I.U.

SUMMARY

The present invention may be generally described as a method for producing L-Asparaginase from a microbial organism which includes the step of growing the micro-organism in a nutrient medium containing a substantial amount of free L-threonine or lactic acid and free amino acids, and in particular free L-glutamic acid and L-methionine.

THE PREFERRED EMBODIMENTS

By use of the present invention greater quantities of L-Asparaginase may be produced from a given quantity of a micro-organism, thus reducing the expense of producing the enzyme and rendering it economically feasible for human administration.

The advantages of the present invention can best be understood by reference to the following examples.

EXAMPLE I

A nutrient medium for growth of a microbial organism was prepared by diluting 20 liters of a corn steep liquor, specifically Corn Steepwater (Corn Products Co., New York, N.Y.), to 60 liters with deionized water which was adjusted to pH 7.0–7.5 with potassium hydroxide. A heavy precipitate which formed during the adjustment of the pH of the Corn Steepwater solution was removed by filtration and the filtrate after being heated to the boiling point was again filtered. The resulting filtrate was then diluted to 400 liters with deionized water and steam sterilized. *E. coli* (obtained from the Wadley Research Institute, Dallas, Tex. and identified as their HAP strain) was grown aerobically for 12–18 hours at 37° C. in the above nutrient medium.

The nutrient medium yielded 3.1 mg. (dry wt.) cells per ml. of culture and produced cells containing 0.95 I.U. L-Asparaginase per mg. (dry wt.) cells.

The L-Asparaginase obtained from the *E. coli* cells harvested from the diluted corn steep liquor medium described above represents 10 to 20 times more L-Asparaginase than can be obtained from any nutrient medium heretofore employed for the growth of microbial organisms yielding L-Asparaginase.

EXAMPLE II

The procedure of example I was repeated on a smaller scale, except that each of the micro-organisms listed in the table I were employed to inoculate the diluted corn steep liquor nutrient medium. The activity of the L-Asparaginase obtained from each of the micro-organisms and the quantity of cells obtained are also detailed in table I.

TABLE I

| Microorganism | Source* | Asparaginase activity I.U. per mg (dry wt) cells | Cell growth mg (dry wt) cells per ml culture |
|---|---|---|---|
| E. coli 055:B5 | 1 | 0.083 | 4.13 |
| E. coli 020 | 1 | 0.093 | 3.06 |
| E. coli 02 | 1 | 0.237 | 2.06 |
| E. coli 04 | 1 | 0.054 | 4.05 |
| E. coli 11303 | 2 | 0.780 | 2.60 |
| E. coli PA | 3 | 0.207 | 3.75 |
| E. coli PB | 3 | 0.336 | 3.80 |
| E. coli PC | 3 | 0.211 | 3.68 |
| E. coli 11775 | 2 | 0.515 | 2.92 |
| E. coli 14948 | 2 | 0.386 | 2.24 |
| E. coli HAP (aerobic) | 4 | 0.950 | 3.10 |
| E. coli HAP (anaerobic) | 4 | 0.400 | 0.44 |
| E. coli K-202 | 3 | 0.805 | 1.44 |
| Serratia marcescens A5968 | 1 | 0.188 | 2.28 |
| Serratia marcescens 13880 | 2 | 0.306 | 1.68 |
| Bacillus subtilis subspecies niger | 3 | 0.160 | 1.56 |
| Pseudomonas aeruginosa B-475 | 3 | 0.960 | 0.92 |
| Pseudomonas aeruginosa 10145 | 3 | 0.055 | 3.00 |

* 1. Communicable Disease Center, Atlanta, Georgia.
  2. American Type Culture Collection.
  3. Food and Drug Administration, Dallas, District.
  4. Wadley Research Institute, Dallas, Texas.

EXAMPLE III

The procedure of example I was repeated on a reduced scale except that as the nutrient medium there was substituted a diffusate corn steep solution which was prepared by dialyzing 150 ml. of 33 percent Corn Steepwater (pH 7) against 1,000 ml. deionized water in a cellulose dialysis tube at 5° C. for 24 hours with constant stirring. The *E. coli* HAP culture was used to inoculate the sterile nutrient medium. The nutrient medium yielded 2.10 mg. (dry wt.) cells per ml. of culture and produced cells containing 0.85 I.U. of L-Asparaginase per mg. (dry wt.) cells.

EXAMPLE IV

A synthetic nutrient medium containing per liter, 6.5 grams L-glutamic acid, 1.5 grams L-methionine, 6.5 milliliters lactic acid, 53 milligrams $MgCl_2 \cdot 6 H_2O$, 4.7 milligrams $MnCl_2 \cdot 4 H_2O$, 0.3 milligrams $CaCl_2 \cdot 2 H_2O$, 3.0 milligrams $ZnCl_2$, 6.0 milligrams $FeCl_3 \cdot 6 H_2O$, 118 milligrams $K_2SO_4$, 48 milligrams KCl, 4.3 milligrams CuSO₄·5 H₂O and 0.1M potassium phosphate, pH 7.0, was substituted for the corn steep medium of example I. The procedure of example I was repeated on a reduced scale using, as in example I, the *E. coli* HAP strain which produced cells containing 0.79 I.U. L-Asparaginase per mg. (dry wt.) cells, with the nutrient medium yielding 1.52 mg. (dry wt.) cells per ml. culture.

The greatly increased yield of L-Asparaginase from microorganisms grown in corn steep medium, as compared with media heretofore employed, results from the presence of substantial amounts of free L-threonine or lactic acid and free amino acids. The free amino acids of particular importance are free L-glutamic acid and L-methionine and while a nutrient medium containing these components in sufficient amounts can be synthetically compounded, as demonstrated by the preceding example IV, a nutrient medium prepared from a corn steep liquor is much more economical to use since this commercially available medium contains desired constituents in the proper form. Various other nutrient media having substantial amounts of L-threonine or lactic acid and free amino acids including L-glutamic acid and L-methionine may be used. Table II below lists some of the media which may be used. Table II also details cell content per ml. of the culture and asparaginase activity.

TABLE II

| Growth medium | Source* | Asparaginase activity I.U. per mg (dry wt) cells | Cell growth mg (dry wt) cells per ml culture |
| --- | --- | --- | --- |
| Casein hydrolysates: | | | |
| Casitone | 1 | 0.36 | 1.50 |
| Hy-Case amino | 2 | 0.72 | 3.05 |
| N-Z-Amine type E | 2 | 0.50 | 2.00 |
| N-Z-Amine type NAK | 2 | 0.85 | 2.40 |
| N-Z-Amine type B | 2 | 0.92 | 2.60 |
| N-Z-Amine type YT | 2 | 0.69 | 2.40 |
| N-Z-Amine type A | 2 | 0.65 | 2.80 |
| N-Z-Amine type As | 2 | 0.63 | 2.90 |
| N-Z-Case | 2 | 0.64 | 2.10 |
| Hy-Case S.F. | 2 | 1.02 | 2.80 |
| Lactalbumin hydrolysates:** | | | |
| Edamin | 2 | 0.57 | 2.10 |
| Edamin type S | 2 | 0.65 | 2.10 |
| Soy peptone powder hydrolysate | 2 | 0.66 | 1.60 |

* 1. Difco, Detroit, Michigan.
  2. Sheffield Chemical, Norwich, New York.
** These nutrient media were supplemented with 0.02 per cent yeast extract.

The L-glutamic acid and L-methionine, both of which are amino acids, must be present in the nutrient medium as free materials, by which expression is meant that they should not be contained within a protein molecule. Nutrient media containing L-glutamic acid and L-methionine bound within protein molecules can be rendered more productive by acid or enzyme digestion. To illustrate, reference is made to example V below which details the growth of *E. coli* HAP in a nutrient medium containing amino acids bound up with protein molecules. For contrast, reference is also made to example VI below which details the growth of *E. coli* HAP in the same medium, but after release of the amino acids by acid digestion.

EXAMPLE V

The procedure of example I was repeated, except that as the nutrient medium there was employed Nutrient Broth (Difco, Detroit, Mich.). The medium after preparation as described in example I contained 0.8 grams of Nutrient Broth per 100 milliliters. The nutrient medium yielded 0.70 mg. (dry wt.) *E. coli* cells per ml. of the culture and the L-Asparaginase activity was 0.08 I.U. per mg. (dry wt.) cells.

EXAMPLE VI

The procedure of example V was repeated except the Nutrient Broth before compounding of the medium was hydrolyzed in 6N HCl in a sealed glass ampul which was autoclaved at 15 p.s.i.g. for 24 hours. The contents of the ampul were dried over NaOH in a vacuum desiccator at 37° C. to remove HCl and water. The dried hydrolysate was reconstituted in deionized water and a nutrient medium was prepared therefrom as described in example I.

The nutrient medium yielded 2.00 mg. (dry wt.) *E. coli* cells per ml. culture and the L-Asparaginase activity was 0.95 I.U. per mg. (dry wt.) cells.

The freeing of the amino acids greatly enhances the productivity of a nutrient medium as is clear from comparison of examples V and VI.

Corn steep liquor which is commercially available contains free L-glutamic acid, L-methionine and other amino acids, as commercial processes from which the corn steep liquor is extracted as a byproduct employ an acid for extraction of the constituents contained with the corn steep.

Nutrient media which contain either lactic acid or free L-threonine as well as free L-glutamic acid and L-methionine together with the numerous minerals commonly found in nutrient media will give significantly greater yields of L-Asparaginase than any nutrient media theretofore employed. While the presence of either lactic acid or free L-threonine is effective when combined with free L-glutamic acid and L-methionine, nutrient media having both lactic acid and L-threonine will, of course, also be effective.

A nutrient medium compounded as described in example IV, but without any L-methionine being added will produce approximately the same number of *E. coli* cells as the medium of example IV. Specifically, 1.51 mg. (dry wt.) cells per ml. culture can be obtained in the absence of L-methionine, while 1.52 mg. (dry wt.) cells per ml. culture was produced in example IV. However, the activity of the L-Asparaginase drops in the absence of L-methionine to 0.57 I.U. per mg. (dry wt.) cells as contrasted with 0.79 I.U. per mg. (dry wt.) cells with L-methionine.

Similarly, if lactic acid is omitted from the medium of example IV, the cell growth drops to 1.20 mg. (dry wt.) cells per ml. culture and the L-Asparaginase activity to 0.59 I.U. per mg. (dry wt.) cells.

The omission of L-glutamic acid from the medium of example IV yields 0.30 mg. (dry wt.) cells per ml. of culture with an L-Asparaginase activity of 0.85 I.U. per mg. (dry wt.) cells being realized.

Thus, for optimum productivity of cells and L-Asparaginase activity, lactic acid or its equivalent free L-threonine and free L-glutamic acid and L-methionine should all be present.

It has also been observed that a nutrient medium containing in excess of about 10 percent by volume of a corn steep liquor does not yield greater quantities of L-Asparaginase than those containing about 10 percent. Nutrient media containing between about 5 and 10 percent corn steep liquor are preferred as productivity of L-Asparaginase drops off when the concentration falls below 5 percent, by volume.

Tests have also revealed that the presence of glucose in a nutrient medium, even in a concentration of 0.1 percent, by weight, will very adversely affect the L-Asparaginase productivity of microbial organisms grown in the medium.

The method of the present invention provides the art with a novel method for greatly increasing the production of L-Asparaginase from given quantities of a microbial organism.

L-Asparaginase, as previously mentioned, has utility as a drug for causing complete regression of tumors in animals and is presently being administered to humans in an attempt to cure leukemia and other types of cancer.

While rather specific terms have been employed to describe several embodiments of the present invention, they are not intended, nor should they be construed as a limitation upon the invention as defined by the following claims.

What is claimed is:

1. In the method of producing L-Asparaginase from a microbial organism, the step consisting essentially of:

aerobically growing the organism in a nutrient medium which is substantially free of glucose and contains an effective growth stimulating amount of free L-glutamic acid and free L-methionine, and free lactic acid.

2. The method of claim 1, wherein said nutrient medium is a water diluted corn steep liquor.

3. The method of claim 2, wherein the water diluted corn steep liquor has been filtered after adjustment of the pH to about 7 and sterilized.

4. The method of claim 1, wherein the nutrient medium is casitone.

5. The method of claim 1, wherein the nutrient medium is hydrolyzed Nutrient Broth.

6. The method of claim 1, wherein the nutrient medium is Soy peptone powder hydrolysate.

7. The method of claim 1, wherein the nutrient medium contains a hydrolyzed protein which contains substantial amounts of lactic acid, free L-methionine and free L-glutamic acid.

8. In a method of producing L-Asparaginase from an L-Asparaginase producing strain of *Escherichia Coli* the improvement consisting essentially of:

aerobically growing said *Escherichia Coli* in a nutrient medium which is substantially free of glucose and contains an effective growth stimulating amount of free L-glutamic acid and free L-methionine, and free lactic acid.

9. The method of claim 8 wherein said nutrient medium is a water-diluted corn steep liquor.

10. The method of claim 9 wherein said water-diluted corn steep liquor has been filtered after adjustment to the pH of about 7 and sterilized.

11. A method of producing L-Asparaginase from L-Asparaginase-producing strain of *Escherichia Coli* comprising:

a. hydrolyzing a nutrient broth which is substantially free of glucose and contains the amino acids, L-glutamic acid and L-methionine bound within protein molecules and lactic acid to thereby free the amino acids; and thereafter b. aerobically growing the *Escherichia Coli* in said medium.

* * * * *